United States Patent [19]
Maenpaa

[11] Patent Number: 5,600,705
[45] Date of Patent: Feb. 4, 1997

[54] METHOD FOR CALL ESTABLISHMENT

[75] Inventor: Sanna Maenpaa, Espoo, Finland

[73] Assignee: Nokia Telecommunications Oy, Espoo, Finland

[21] Appl. No.: 387,926

[22] PCT Filed: Sep. 20, 1993

[86] PCT No.: PCT/FI93/00376

§ 371 Date: Feb. 23, 1995

§ 102(e) Date: Feb. 23, 1995

[87] PCT Pub. No.: WO95/01073

PCT Pub. Date: Jan. 5, 1995

[30] Foreign Application Priority Data

Jun. 23, 1993 [FI] Finland ................... 932920

[51] Int. Cl.⁶ .............................. H04Q 7/22
[52] U.S. Cl. .................. 379/58; 379/59; 455/33.1
[58] Field of Search .................. 379/58, 59, 60; 455/33.1, 33.2

[56] References Cited

U.S. PATENT DOCUMENTS 5,400,390  3/1995  Salin ........................... 379/59
5,428,665  6/1995  Lantto ......................... 379/58

FOREIGN PATENT DOCUMENTS 462728  12/1991  European Pat. Off. .
9222174  12/1992  WIPO .

OTHER PUBLICATIONS

European Telecommunication Standard 300 175 (parts numbered ETS 300–175–1 through ETS 300 175–9), Oct. 1992.
"Digital Subscriber signalling System, No. 1, (DDS 1), Network Layer User–Network Management" CCITT, vol. VI—Fascicle VI, 11, 14–25 Nov. 1988.
"Specifications of Signalling System No. 7," CCITT, vol. VI—Fascicle VI, 8, 14–25 Nov. 1988.
GSM 09.02—version 3.8.0: Jan. 1991, pp. 379–382, p. 406.
ETSI, GEM 01.04/18, Version 2.00.00.
GSM 03.08—version 3.7.0: Jan. 1991, p. 18.

*Primary Examiner*—Curtis Kuntz
*Assistant Examiner*—Nay Aung Maung
*Attorney, Agent, or Firm*—Cushman Darby & Cushman IP Group of Pillsbury Madison & Sutro LLP

[57] ABSTRACT

The invention relates to methods for call establishment in a cellular radio system. In the inventive method, the visitor location register stores information (405) on whether the subscriber (CPP) is located within the service area of its home private branch exchange (PBX) indicated with a home location area identifier, in response to the location data request (106) placed by the mobile services switching center the visitor location register (VLR) checks the subscriber data of the subscriber and finds that the subscriber (CPP) is located within the service area of its home private branch exchange indicated with a home location area identifier, the visitor location register does not initiate the mobility management functions pertaining to normal connection establishment in the system.

10 Claims, 4 Drawing Sheets

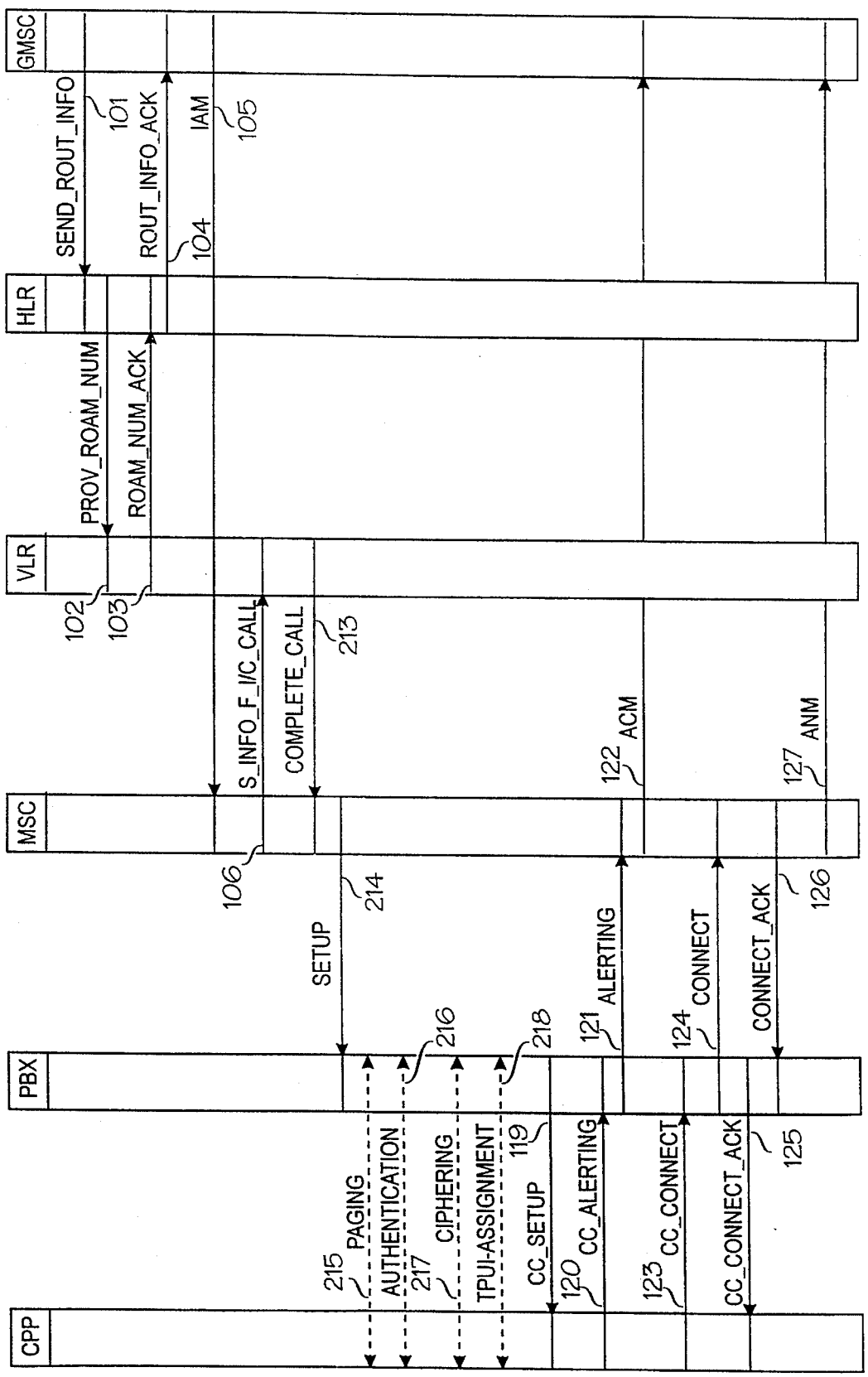

METHOD FOR CALL ESTABLISHMENT

FIELD OF THE INVENTION

The invention relates to a method for call establishment in a cellular radio system comprising a mobile services switching centre and a private branch exchange connected thereto, and a visitor location register for storing subscriber and location data on subscribers located within the service area of the mobile services switching centre, in which method: the mobile services switching centre is requested to establish a call to a subscriber, the mobile services switching centre requests the visitor location register to provide location data of the subscriber.

BACKGROUND OF THE INVENTION

Various cellular radio systems or mobile telephone systems are in use and being designed in which the geographic coverage area of the system is divided into smaller separate service areas, i.e. cells, in such a way that when the radiotelephone or mobile telephone is located in a cell, it communicates with the fixed network through a fixed radio station incorporated in the cell. The mobile telephones belonging to the system can roam freely within the area of the network from one cell to another. One such system is the digital mobile telephone system GSM (Global System for Mobiles).

Cordless telephone (CT) systems, such as the DECT system, have recently come out on the market. The DECT system comprises a base station, which is normally based on access to an existing fixed telephone network. There are three main types of base stations: a residential base station, a base station connected to a private branch exchange in an office, and telepoint base stations.

Cordless telephone systems can also be connected to mobile telephone networks, for instance to the GSM system. The private branch exchange (PBX) of a cordless telephone system can be connected to the GSM system for example by using "DSS 1, Q.930–Q.940, 1989, Digital Subscriber Signalling System No. 1, Network Layer, User-Network Management, CCITT" signalling supplemented with mobility management messages. The PBX of a cordless telephone system is connected to the switching centre of the GSM system such that the subscribers in the PBX can roam within the service area of the GSM system, and the subscribers in the PBX can make use of the mobility management procedures of the GSM system and roam within the service area of DECT systems connected to the GSM system. In such a case, mobile subscribers are attached to the PBX in accordance with the DECT radio path protocol "ETS 300175, Radio Equipment and Systems (RES), Digital European Cordless Telecommunications (DECT), Common Interface", for instance. It has also been possible to connect fixed subscribers to the PBX, for example in accordance with the ISDN signalling protocol. In that event, also calls originating from the GSM system or from a GSM-connected telephone network can be routed to subscribers, for instance DECT subscribers, located within the service area of the PBX.

In the prior art solution, in the case of an incoming call to the PBX, register interrogation procedures in accordance with the GSM recommendations are performed, irrespective of the location of the called subscriber. FIG. 1a shows call establishment procedures in accordance with the prior art. When the call arrives at a first mobile services switching centre, which may be a gateway mobile services switching centre (GMSC), the GMSC requests 101 for routing information from the home location register (HLR) of the called subscriber by sending a SEND_ROUT_INFO message. The home location register HLR checks the subscriber data from its subscriber database and sends 102 a roaming number request PROV_ROAM_NUM to the visitor location register VLR of the location area of the subscriber, and the VLR sends 103 a roaming number and routing information as an acknowledgement ROAM_NUM_ACK to the home location register HLR. The home location register HLR further sends 104 the routing information and roaming number as an acknowledgement ROUT_INFO_ACK to the gateway mobile services switching centre (GMSC), which sends 105 information on the subscriber, the incoming call and the roaming number in an initial address message (IAM) (specified in the common channel signalling standard "Q.721–Q.766, 1989, Specifications of Signalling System No. 7, CCITT, Vol. VI—Fascicle VI.8, p. 251") to the mobile services switching centre MSC of the location area of the subscriber. The call may also arrive at the mobile services switching centre MSC directly from the MSC's own service area. In that case, the above gateway mobile services switching centre GMSC is replaced with the same mobile services switching centre MSC in the service area of which both the A subscriber and B subscriber are located. When the mobile services switching centre MSC has received information on the incoming call, it requests 106 the visitor location register VLR of the location area of the subscriber to provide routing information for the call to be routed by means of a S_INFO_F_I/C_CALL message. After having received the message or request, the visitor location register VLR performs a subscriber data check and initiates the prior art mobility management functions which form part of the normal operations for establishing a connection and are set forth in greater detail in the GSM recommendation "GSM 09.02, Mobile Application Part Specification, ETSI". The first mobility management function is the paging function 107, by means of which the subscriber is located prior to call establishment. After the paging, the mobile services switching centre MSC sends 108 a resource request PROCESS_ACC_REQ to the visitor location register VLR. This is followed by authentication 109 of the subscriber. Authentication is a process wherewith the subscriber is identified as a legal user of the system. Subsequent to the authentication, ciphering 110 of the messages employed is performed. Thereafter the visitor location register VLR responds to the resource request by sending 111 an acknowledgement ACCESS_REQ_ACC. Following this, assignment 112 of the temporary mobile subscriber identity TMSI_ASSIGNMENT of the mobile subscriber is performed. The procedure according to this Figure is continued in FIG. 1b.

FIG. 1b is a continuation of the prior art call establishment shown in FIG. 1. When all the connection establishment functions 106, 107, 108, 109, 110, 111 and 112 shown in FIG. 1a have been performed, the visitor location register VLR sends 113 a COMPLETE_CALL message by which the visitor location register indicates that a call can be established. Only then is the mobile services switching centre MSC free to establish a call to the subscriber. In that situation, the mobile services switching centre MSC sends a connection establishment request 114 as a SETUP message to the home private branch exchange PBX of the subscriber. Thereafter, the PBX sends a connection establishment CC_SETUP message 119 to the subscriber station CPP, that is, to the hand-held mobile telephone attached to the PBX. It is to be noted that fixed subscribers may also access to the PBX. The subscriber station CPP responds to the CC_SETUP message by sending 120 a CC_ALERTING message to the PBX. Following this, the PBX sends 121 a corresponding ALERT message to the mobile services switching centre MSC, which sends 122 an address complete message (ACM) further to the gateway mobile services switching centre GMSC, indicating that all digits required for routing the call have been received. When a connection has been established between the subscriber station CPP and the PBX, the subscriber station CPP sends 123 a CC_CONNECT message to the PBX, and the PBX transmits 124 this message to the mobile services switching centre MSC as a CONNECT message. The PBX acknowledges the message sent to the mobile services switching centre by sending 125 a CC_CONNECT_ACK message to the subscriber station CPP. Respectively, the mobile services switching centre acknowledges the received CONNECT message by sending 126 a CONNECT_ACK acknowledgement message to the home private branch exchange PBX of the subscriber. Thereafter, the mobile services switching centre indicates that the subscriber has responded to the call by sending 127 a response message ANM to the gateway mobile services switching centre GMSC.

It can be seen from the foregoing that establishment of a connection to a subscriber located within the service area of a private branch exchange connected to a cellular radio network is a complicated and cumbersome process. It should be noted that the prior art call establishment procedure as set forth above must be performed always when a subscriber located within the service area of the private branch exchange is to be called. The mobility management functions to be performed in the GSM system which form part of the operations for connection establishment, i.e. the paging 107, subscriber authentication 109, ciphering 110, TMSI assignment 112, the S_INFO_F_I/C_CALL 106, PROCESS_ACC_REQ 108, ACCESS_REQ_ACC 111 and COMPLETE_CALL 113 messages to be sent, the roaming number request PROV_ROAM_NUM 102 placed by the home location register HLR and the response ROAM_NUM_ACK 103 provided thereto by the visitor location register VLR, as described in the GSM 09.02 recommendation, load considerably the signalling capacity of the mobile telephone network used. Heavy loading of the signalling capacity may lead to an overload and system failure, and naturally gives rise to useless traffic in the network.

DISCLOSURE OF THE INVENTION

It is an object of the present invention to provide a method for call establishment avoiding the above problems when a call is routed to a subscriber either through the mobile services switching centre of the location area of the subscriber in the GSM system or through another mobile services switching centre in the GSM system, to the home private branch exchange of the subscriber. The object is to diminish useless mobility management functions pertaining to connection establishment as well as sending of useless signalling messages.

This novel method for call establishment is achieved with the method of the invention, which is characterized in that the visitor location register stores information on whether the subscriber is located within the service area of its home private branch exchange indicated with a home location area identifier, in response to the location data request placed by the mobile services switching centre the visitor location register checks the subscriber data of the subscriber and finds that the subscriber is located within the service area of its home private branch exchange indicated with a home location area identifier, the visitor location register does not initiate the mobility management functions pertaining to normal connection establishment in the system performed by the mobile services switching centre but sends to the mobile services switching centre an indication of the fact that the call can be switched, the mobile services switching centre sends a connection establishment request to the private branch exchange of the home location area of the subscriber, the home private branch exchange of the subscriber performs the necessary operations for establishing a connection and establishes a connection between the subscriber and the mobile services switching centre.

Another embodiment of the invention relates to subscribers that are always within the service area of their home private branch exchange. The second embodiment of the invention is a method for call establishment in a cellular radio system comprising a mobile services switching centre, a private branch exchange connected thereto and a visitor location register and a home location register for storing subscriber and location data on subscribers, in which method the mobile services switching centre requests, to establish a call to the subscriber, the home location register of the subscriber to provide subscriber and location data of the subscriber on the basis of the subscriber number. This method is characterized in that the home location register of the subscriber maintains a PBX parameter, if the subscriber and location data of the subscriber are not found in the home location register on the basis of the subscriber number of the subscriber, the home location register compares the subscriber number of the subscriber with said PBX parameter, and if the desired correspondence between the subscriber number of the subscriber and the PBX parameter exists, the home location register forms a roaming number for the subscriber on the basis of the roaming parameter of the home PBX, said roaming number carrying information on the fact that the subscriber is located within the area of its home PBX, and sends it to the mobile services switching centre, one mobile services switching centre requests the visitor location register of the location area of the subscriber to provide routing information for the subscriber by sending a subscriber and location data request message pertaining to the subscriber and containing said roaming number, if the subscriber data of the subscriber are not found in the visitor location register on the basis of the roaming number, the visitor location register compares the roaming number with the subscriber home PBX roaming parameter that is stored by the visitor location register, and if the desired correspondence between these exists, the visitor location register does not initiate the mobility management functions pertaining to normal connection establishment in the system but sends to the mobile services switching centre an indication of the fact that the call can be switched, the mobile services switching centre sends a connection establishment request to the PBX of the home location area of the subscriber, the home private branch exchange PBX of the subscriber performs the necessary operations for establishing a connection and establishes a connection between the subscriber and the mobile services switching centre.

The invention is based on the idea that when there is an incoming call to a subscriber located within the service area of its home PBX, optimized signalling wherefrom useless signalling and procedural steps are omitted is employed instead of normal GSM signalling. This is realized by effecting the connection establishment initially in compliance with normal GSM call establishment, up to the point when the mobile services switching centre of the location area of the subscriber requests the visitor location register to provide information on the subscriber and its location. In prior art connection establishment, the visitor location register has at this point initiated the mobility management functions pertaining to connection establishment, i.e. the complex paging, authentication, ciphering and TMSI assignment procedures. In the present inventive solution, the visitor location register exceptionally sends an indication of the mobility management functions performed back to the mobile services switching centre in the form of a COMPLETE_CALL message. By means of this message, the visitor location register indicates to the mobile services switching centre that it can initiate normal establishment of a connection. In that situation, the mobile services switching centre sends directly a connection establishment request to the home PBX of the subscriber without any cumbersome mobility management functions pertaining to the connection establishment, which would normally have to be performed in any case. The connection establishment request is sent to the home PBX of the subscriber, i.e. to the exchange in whose service area the called subscriber is located. Upon having received the connection establishment request, the PBX performs the necessary mobility management functions locally and establishes a connection between the subscriber and the mobile telephone network.

The second embodiment of the invention is based on the fact that the home location register identifies subscribers located within the service area of the home PBX of the subscriber on the basis of, for example, the subscriber number of the subscriber, and the visitor location register identifies the subscribers located within the service area of the home PBX on the basis of, for example, a part of the roaming number. Thus subscriber or location data of the subscriber need not be stored in the home location register or the visitor location register.

It is an advantage of such a call establishment method that it reduces internal signalling traffic, i.e. internal messages, in the mobile telephone system. Thus the load on the telecommunication connections between the network elements of the system is reduced and their risk of overload and likelihood of congestion is diminished.

A further advantage of the invention is the fact that it reduces the load on the network components of the mobile telephone network, such as the subscriber registers, and diminishes the likelihood of congestion and risk of overload on the system.

Still another advantage of the invention is the fact that the invention expedites the connection establishment when a call is placed by a subscriber in a mobile telephone network, or another telecommunications network having connection with a mobile telephone network, to a subscriber located within the service area of a PBX connected to the mobile telephone network. Connection establishment is expedited, since "useless" mobility management functions are omitted from the establishment of the connection.

It is an advantage of the second embodiment of the invention that subscriber and/or location data on the subscriber need not be stored in the location registers of the system, i.e. in the home location register and the visitor location register.

BRIEF DESCRIPTION OF THE DRAWINGS

In the following the invention will be set forth in greater detail with reference to the accompanying drawings, wherein.

FIG. 2 is a signalling diagram of the call establishment procedure in accordance with the invention.

DETAILED DESCRIPTION OF THE INVENTION

Figure 1A:
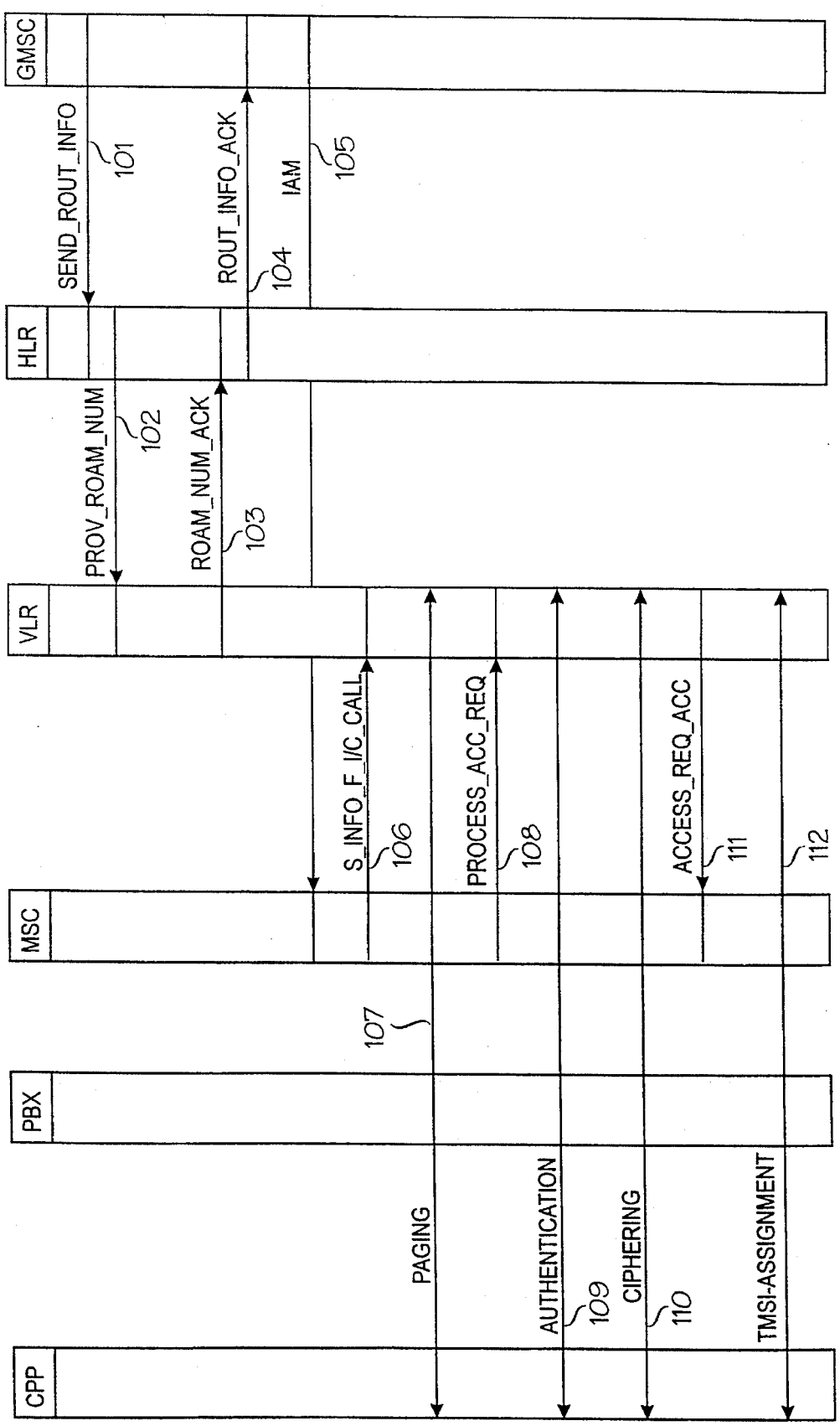
FIGS. 1a and 1b are signalling diagrams of prior art call establishment with the necessary mobility management functions.
Figure 1B:
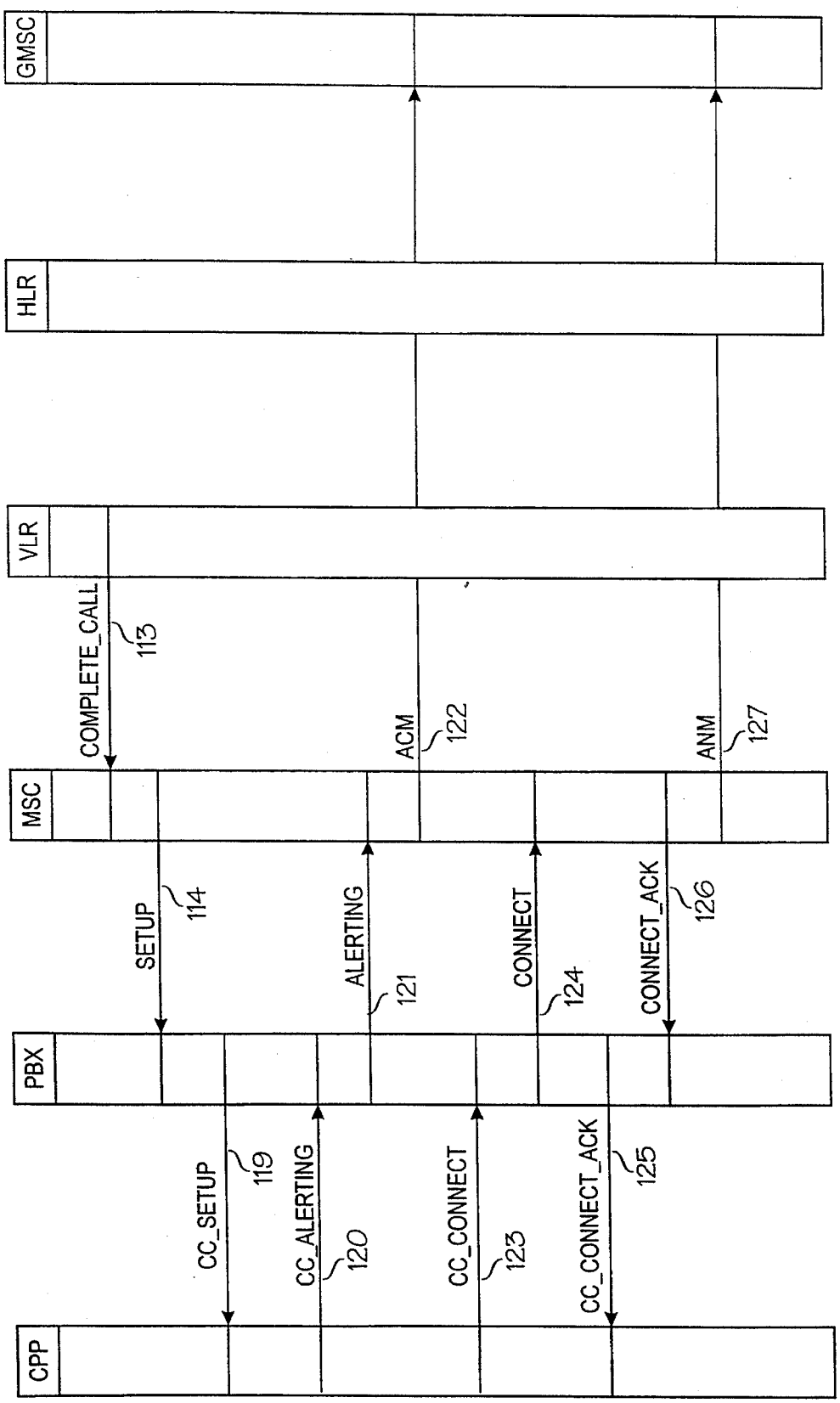

FIGS. 1a and 1b have been explained already in connection with the description of the prior art.

FIG. 2 is a signalling diagram of the call establishment procedure in accordance with the invention.

If the A subscriber initiating a call is located within the service area of another mobile services switching centre than the subscriber (B subscriber) or in a fixed telephone network, the mobile services switching centre MSC receives information on the incoming call by way of the gateway MSC (GMSC) informing the subscriber of an incoming call. In this case, the mobile services switching centre receives information on the incoming call and the subscriber as well as the necessary routing information, as is shown by means of reference numerals 101, 102, 103, 104 and 105 in FIG. 1a.

On the other hand, if the A subscriber initiating the call is located within the service area of the same mobile services switching centre MSC as the subscriber (B subscriber), the mobile services switching centre receives information on the call to be switched directly from the base station controller or base station.

In the second embodiment of the invention, when a call arrives at a first mobile services switching centre which may be a gateway mobile services switching centre GMSC, the GMSC requests 101 the home location register HLR of the called subscriber to provide routing information by sending a SEND_ROUT_INFO message. The home location register of the subscriber maintains a PBX parameter according to the invention. The PBX parameter may have been set for instance so as to correspond fully or partly to the MSISDN (Mobile Subscriber ISDN) number of the subscriber. The home location register HLR checks the subscriber data from its subscriber database, and since in this second embodiment of the invention the subscriber data are not stored in the home location register or visitor location register, the home location register performs the following comparison operation: The home location register compares the subscriber's MSISDN number, obtained in said SEND_ROUT_INFO message 101 from the mobile services switching centre, with the inventive PBX parameter that it stores. If a part of the subscriber MSISDN number, for instance its prefix, corresponds to the PBX parameter, the home location register HLR knows that the subscriber is a home subscriber in said PBX. In that situation, the home location register forms a roaming number for the subscriber on the basis of the roaming parameter of the home PBX that it stores in its database, said roaming number carrying information on the fact that the subscriber is located within the area of its home PBX. The formed roaming number may comprise, for instance, wholly or in part said home PBX roaming parameter. Thereafter the home location register (HLR) sends 102 the roaming number it has formed as an acknowledgement, as a ROUT_INFO_ACK message, to the gateway mobile services switching centre GMSC. It is to be noted that in this second embodiment of the invention, the home location register HLR does not send a roaming number request to the visitor location register VLR. Having received the roaming number from the home location register HLR, the gateway mobile services switching centre GMSC sends 105 information on the subscriber, the incoming call and the roaming number to the mobile services switching centre MSC of the location area of the subscriber in an initial address message IAM, which is specified in the common channel signalling standard "Q.721–Q.766, 1989". The call may also arrive at the mobile services switching centre directly from the mobile services switching centre's own service area. In that case, the above-stated gateway mobile services switching centre GMSC is replaced with the same mobile services switching centre MSC in whose service area both the A subscriber and B subscriber are located. Having received information on the incoming call, the mobile services switching centre requests 106 the visitor location register VLR of the location area of the subscriber to provide routing information for the call to be routed by means of a S_INFO_F_I/C_CALL message. Having received the message or request, the visitor location register VLR performs a check of the subscriber data. In the solution according to the second embodiment of the invention, the subscriber data of the subscriber are not stored in the visitor location register VLR, and thus they cannot be found when they are sought in the database of the visitor location register on the basis of the roaming number. In that situation, the visitor location register compares the roaming number obtained in the IAM message from the home location register through the mobile services switching centre with the home PBX roaming parameter that is stored in the visitor location register. The home PBX roaming parameter may be wholly or in part the same as the roaming number sent to the visitor location register. If the desired correspondence exists between the roaming number and the roaming parameter, for instance such that the prefix of the roaming number is the same as the PBX roaming parameter, the visitor location register knows that the optimized signalling mode is to be employed. In such a situation, the visitor location register does not initiate the mobility management functions pertaining to normal connection establishment in the system.

These mobility management functions are omitted also in the first embodiment of the invention. Therein the visitor location register stores information on whether the subscriber is located within the service area of its home private branch exchange indicated with a home location area identifier. This information may be a flag stored in the database of the visitor location register, for instance. When the mobile services switching centre now places a location data request, the visitor location register checks the subscriber data of the subscriber and finds that the subscriber is located within the service area of its home private branch exchange indicated with a home location area identifier. In that situation, the visitor location register does not initiate the mobility management functions pertaining to normal connection establishment in the system but sends to the mobile services switching centre an indication of this, of the incoming call and of the fact that optimized signalling is to be employed. Thus the mobile telephone network does not perform the mobility management functions pertaining to normal connection establishment in the GSM system. These omitted "useless" signalling messages and mobile applications part (MAP) messages, each of which may comprise several messages and which together constitute the mobility management functions, are denoted by reference numerals 106, 107, 108, 109, 110, 111, 112 and 113 in connection with the description of FIGS. 1a and 1b. Thus also the prior art "useless" register interrogation, paging and other functions performed by the network elements participating in the sending and reception of these messages are omitted, and the operation of the system is made faster, simpler and lighter. In accordance with the invention, the mobile services switching centre MSC of the location area of the subscriber sends a connection establishment request 214 to the home PBX of the subscriber. The connection establishment request corresponds to the SETUP connection establishment request indicated by reference numeral 114 in FIG. 1b. A mobile services switching centre MSC operating in accordance with the inventive method is thus capable of handling a COMPLETE_CALL message 213 sent by the visitor location register VLR, that is, a connection establishment request arriving in such a new and unexpected situation, since the mobile services switching centre is provided with a handling mechanism and suitable handling means, realized for instance in software, for such a message. As the next step, the home PBX of the subscriber starts performing the mobility management functions pertaining to connection establishment in the service area of the PBX. The PBX may either perform all of the mobility management functions set out hereinbelow, perform only part of them or omit them. The first function pertaining to mobility management is the paging function 215, whereby the subscriber within the service area of the PBX is located. Thereafter the PBX activates the authentication 216 of the subscriber within the service area of the PBX. Subsequent to this step, the PBX performs ciphering 217 of the messages employed on the radio route. This is followed by assignment 218 of the temporary user identification, TPUI_ASSIGNMENT (the temporary subscriber identity TPUI corresponds to the TMSI in the GSM). The TPUI may be the same as, or different from, the GSM TMSI. If the subscriber in the PBX is a DECT subscriber, the mobility management functions, i.e. the paging, authentication, ciphering and TPUI assignment, are performed in accordance with the DECT standard "European Telecommunication Standard ETS 300 175-5: Radio Equipment and Systems. Digital European Cordless Telecommunications Common Interface, Part 5: Network layer". Thereafter the call establishment is continued as normal prior art call establishment in accordance with FIG. 1b in such a way that the message sending functions denoted by reference numerals 119, 120, 121, 122, 123, 124, 125, 126 and 127 and the consequent functions executed by the network elements are performed in accordance with the prior art.

Figure 3:
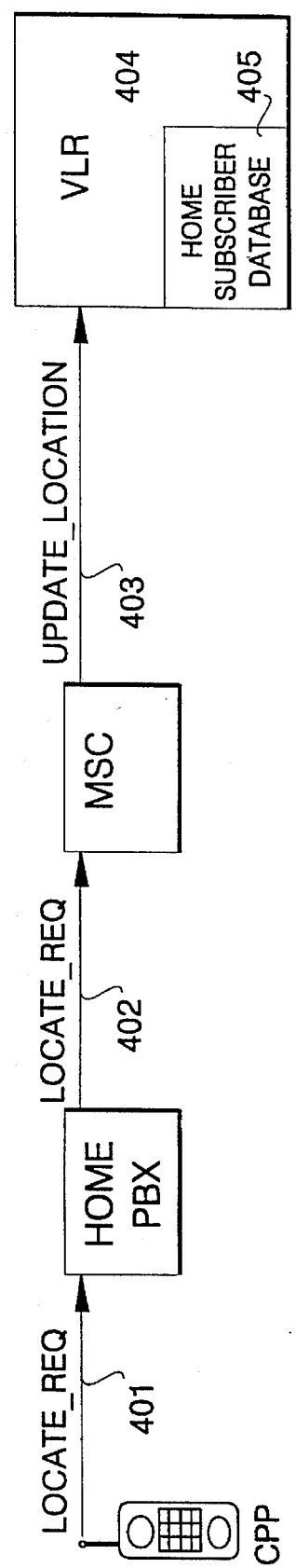
FIG. 3 is a functions diagram of the updating of the home location area identity of a subscriber in different subscriber registers in a mobile telephone network.

FIG. 3 is a functions diagram of the updating of the home location area identity of a subscriber in different subscriber registers in a mobile telephone network. In implementing the method of the invention, only those subscribers in the PBX need to be indicated as subscribers of the home PBX in the visitor location register VLR that also roam outside the service area of the home PBX. This is necessary because if the subscriber is always located within the service area of the home PBX, for example if it is a fixed subscriber, the default value can automatically be set at said subscriber being located specifically within the service area of its own PBX. The subscriber is indicated as a subscriber of the home PBX by means of subscriber identity (IMSI=international mobile subscriber identity) and location area identity. In the invention, a home subscriber database 405 is formed in the visitor location register VLR connected to the home PBX out of the identifiers of those subscribers whose home location area is in a given PBX located within the service area of said VLR. Thus one PBX forms one home location area. Such a novel home subscriber database 405 contains the identifier of said PBX, i.e. the identifier of the corresponding home location area, and the IMSI of the subscriber concerned. The home subscriber database 405 also stores a flag, for example one bit, indicating whether the subscriber is located within the area of its home PBX or not. The home subscriber database may be for instance as outlined in the GSM recommendation "TS GSM 03.08, 1992, Organisation of Subscriber Data, ETSI", particularly Table 1, page 18 therein, but adapted in such a manner that the inventive data are included therein.

As the subscriber CPP arrives in its home PBX and updates 401 its location by requesting location updating, sending a LOCATE_REQ message to the PBX, the PBX sends 402 the location updating request further to the mobile services switching centre MSC of the location area of the subscriber. The mobile services switching centre MSC transmits 403 the location updating request further to the visitor location register VLR of the location area by sending an UPDATE_LOCATION message comprising the subscriber IMSI and the identifier of the home PBX of the subscriber. The visitor location register checks 404 from the subscriber home PBX specific home subscriber database 405 whether the identifier of said subscriber is found in the home subscriber database. If the identifier of the subscriber is found in the home subscriber database, the visitor location register updates in the home subscriber database a home subscriber parameter, i.e. a flag indicating that the subscriber is located within its home location area.

The drawings and the description pertaining thereto are only intended to illustrate the idea of the invention. The call establishment method according to the invention may vary in its details within the scope of the claims. Even though the invention has been set forth in the above mainly in the context of the GSM system, the invention may also be used in other kinds of mobile telephone systems.

I claim:

1. A method for call establishment in a cellular radio system comprising a mobile services switching centre and a private branch exchange connected thereto, and a visitor location register for storing subscriber and location data on subscribers located within the service area of the mobile services switching centre in which method the mobile services switching centre is requested to establish a call to a subscriber, the mobile services switching centre requests the visitor location register to provide location data of the subscriber, the visitor location register stores information on whether the subscriber is located within the service area of its home private branch exchange indicated with a home location area identifier, in response to the location data request placed by the mobile services switching centre the visitor location register checks the subscriber data of the subscriber and finds that the subscriber is located within the service area of its home private branch exchange indicated with a home location area identifier, the visitor location register does not initiate the mobility management functions pertaining to normal connection establishment in the system performed by the mobile services switching centre but sends to the mobile services switching centre an indication of the fact that the call can be switched, the mobile services switching centre sends a connection establishment request to the private branch exchange of the home location area of the subscriber, the home private branch exchange of the subscriber performs operations for establishing a connection and establishes a connection between the subscriber and the mobile services switching centre.

2. A method for call establishment as claimed in claim 1, wherein in connection with the location updating of the subscribers, information is transmitted to the visitor location register on the fact that the subscriber is located within the service area of its home PBX.

3. A method for call establishment as claimed in claim 1, wherein a home subscriber database specific to each home private branch exchange is formed in the visitor location register connected to said mobile services switching centre out of the identifiers of those subscribers whose home location area said home private branch exchange is.

4. A method for call establishment as claimed in claim 2, wherein a home subscriber database specific to each home private branch exchange is formed in the visitor location register connected to said mobile services switching centre out of the identifiers of those subscribers whose home location area said home private branch exchange is.

5. A method for call establishment as claimed in claim 3, wherein, as the subscriber arrives in the service area of the home private branch exchange and performs location updating, the visitor location register of the location area of the subscriber checks from the home PBX specific home subscriber database whether the identifier of said subscriber is found in the home subscriber database.

6. A method for call establishment as claimed in claim 1, wherein the identifier of the home location area of the subscriber is updated, if appropriate, in the visitor location register of the home location area of the subscriber.

7. A method for call establishment in a cellular radio system comprising a mobile services switching centre, a private branch exchange connected thereto, and a visitor location register and a home location register for storing subscriber and location data on subscribers, in which method the mobile services switching centre requests, to establish a call to the subscriber, the home location register of the subscriber to provide subscriber and location data of the subscriber on the basis of the subscriber number, the home location register of the subscriber maintains a PBX parameter, if the subscriber and location data of the subscriber are not found in the home location register on the basis of the subscriber number of the subscriber, the home location register compares the subscriber number of the subscriber with said PBX parameter, and if the desired correspondence between the subscriber number of the subscriber and the PBX parameter exists, the home location register forms a roaming number for the subscriber on the basis of the roaming parameter of the home PBX, said roaming number carrying information on the fact that the subscriber is located within the area of its home PBX, and sends it to the mobile services switching centre, one mobile services switching centre requests the visitor location register of the location area of the subscriber to provide routing information for the subscriber by sending a subscriber and location data request message pertaining to the subscriber and containing said roaming number, if the subscriber data of the subscriber are not found in the visitor location register on the basis of the roaming number, the visitor location register compares the roaming number with the subscriber home PBX roaming parameter that is stored by the visitor location register, and if the desired correspondence between these exists, the visitor location register does not initiate the mobility management functions pertaining to normal connection establishment in the system but sends to the mobile services switching centre an indication of the fact that the call can be switched, the mobile services switching centre sends a connection establishment request to the private branch exchange of the home location area of the subscriber, the home private branch exchange of the subscriber performs operations for establishing a connection and establishes a connection between the subscriber and the mobile services switching centre.

8. A method for call establishment as claimed in claim 7, wherein the correspondence between the subscriber number of the subscriber and the PBX parameter is such that part of the subscriber number of the subscriber corresponds to the PBX parameter.

9. A method for call establishment as claimed in claim 7, wherein the desired correspondence between the roaming number and the subscriber home PBX roaming parameter is such that part of the roaming number corresponds to the roaming parameter of the home PBX.

10. A method for call establishment as claimed in claim 8, wherein the desired correspondence between the roaming number and the subscriber home PBX roaming parameter is such that part of the roaming number corresponds to the roaming parameter of the home PBX.

* * * * *